United States Patent
Ovsiannikov et al.

(10) Patent No.: US 8,411,943 B2
(45) Date of Patent: Apr. 2, 2013

(54) METHOD AND APPARATUS FOR IMAGE SIGNAL COLOR CORRECTION WITH REDUCED NOISE

(75) Inventors: Ilia Ovsiannikov, Studio City, CA (US); Dmitri Jerdev, South Pasadena, CA (US)

(73) Assignee: Aptina Imaging Corporation, George Town (CY)

( * ) Notice: Subject to any disclaimer, the term of this patent is extended or adjusted under 35 U.S.C. 154(b) by 1402 days.

(21) Appl. No.: 12/059,733

(22) Filed: Mar. 31, 2008

(65) Prior Publication Data

US 2009/0245632 A1    Oct. 1, 2009

(51) Int. Cl.
*G06K 9/00* (2006.01)
(52) U.S. Cl. .................................................. 382/167
(58) Field of Classification Search .......... 382/162, 382/167–169, 270–274, 254, 260; 348/222.1–223.1, 348/650, 241; 358/447, 518–523, 530, 532, 358/1.9, 2.1, 3.01, 3.23
See application file for complete search history.

(56) References Cited

U.S. PATENT DOCUMENTS

| | | | | |
|---|---|---|---|---|
| 4,920,411 A * | 4/1990 | Miyakawa | ................. | 358/523 |
| 5,028,991 A * | 7/1991 | Sekizawa et al. | ........... | 358/537 |
| 5,311,328 A * | 5/1994 | Murata | ..................... | 358/447 |
| 5,345,320 A * | 9/1994 | Hirota | ......................... | 358/518 |
| 5,995,204 A * | 11/1999 | Hoshino et al. | .............. | 355/75 |
| 6,469,747 B1 | 10/2002 | Rai et al. | | |
| 6,915,021 B2 | 7/2005 | Cannata et al. | | |
| 6,982,752 B2 | 1/2006 | Kharitoneko et al. | | |
| 7,006,668 B2 * | 2/2006 | Iguchi et al. | ............... | 382/108 |
| 7,072,511 B2 | 7/2006 | Tan et al. | | |
| 7,082,218 B2 * | 7/2006 | Pollard et al. | .............. | 382/167 |
| 7,227,990 B2 * | 6/2007 | Hirao | ......................... | 382/167 |
| 7,352,393 B2 * | 4/2008 | Sakamoto | .................. | 348/239 |
| 7,477,294 B2 * | 1/2009 | Lohweg et al. | ........... | 348/223.1 |
| 7,630,573 B2 * | 12/2009 | Hayashi et al. | ............. | 382/261 |
| 8,218,207 B1 * | 7/2012 | Harrison, Jr. | ............... | 358/518 |
| 2005/0276475 A1 | 12/2005 | Sawada | | |
| 2006/0038899 A1 | 2/2006 | Tamaru et al. | | |
| 2007/0085911 A1 | 4/2007 | Nakamura | | |

OTHER PUBLICATIONS

Parulski, Ken et al., "Color image processing for digital cameras", Chapter Twelve, CRC Press LLC, Eastman Kodak Company, pp. 1-31, 2003.*
Kharitonenko, I. et al., "Suppression of Noise Amplification During Colour Correction", IEEE, 2002.
"Interpolation and Correction Getting 24-Bit Color from sRGB", Micron Color Processing, 2002.

* cited by examiner

*Primary Examiner* — Jose Couso

(57) ABSTRACT

A method and apparatus for applying color correction to image signals provides different color corrections depending on a characterization associated with a pixel signal being processed or the gain applied to the pixel signal such as a value of a pixel signal being processed. The color corrections may be configured such that darker pixels have less color correction applied to them.

19 Claims, 4 Drawing Sheets

METHOD AND APPARATUS FOR IMAGE SIGNAL COLOR CORRECTION WITH REDUCED NOISE

FIELD OF THE INVENTION

Embodiments of the invention generally relate to image processing and more specifically to correcting color in an acquired image.

BACKGROUND OF THE INVENTION

Solid state imagers such as CCD, CMOS, and others, are in widespread use. FIG. 1 shows one exemplary CMOS imaging device 1 that includes a CMOS active pixel sensor ("APS") pixel array 4 and a controller 6 that provides timing and control signals to enable the readout of image signals captured and stored in the pixels in a manner commonly known to those skilled in the art. Example arrays have dimensions of M×N pixels, with the size of the array 4 depending on a particular application. The imager pixels are read out a row at a time using a column parallel readout architecture. The controller 6 selects a particular row of pixels in the array 4 by controlling the operation of row addressing circuit 2 and row drivers 3. Signals stored in the selected row of pixels are provided on column lines to a readout circuit 7. The pixel signals read from each of the columns are then read out sequentially using a column addressing circuit 8. FIG. 1 shows that the readout analog pixel image signals are converted to digital values by an analog to digital converter 9 and then processed by an image processor 10.

One of the problems with digitally capturing an image is that portions of or an entirety of the captured image may be dimly lit either because of lighting conditions or a low exposure of imager pixels. Dimly lit image portions captured by a pixel array have a low signal-to-noise (SNR) ratio. One of the goals of image processing is to reduce noise in a captured image, particularly in the pixel signals from dimly lit or underexposed pixels.

Color correction is one of the processes applied by image processor 10 to captured image signals. Color correction typically involves adjusting the raw data from the sensor for colors to be correctly displayed on a standard output device such as a computer monitor. The same color correction technique, typically in the form of a color correction matrix, is applied to all pixel values of an image, including pixels which have low signal to noise ratios because of relatively low pixel values. The application of color correction typically deteriorates signal-to-noise ratio. Therefore, an improved color correction process which lowers noise in an image, in particular for pixels with low values and low signal-to-noise ratios, is desirable.

DETAILED DESCRIPTION OF THE INVENTION

Figure 1:
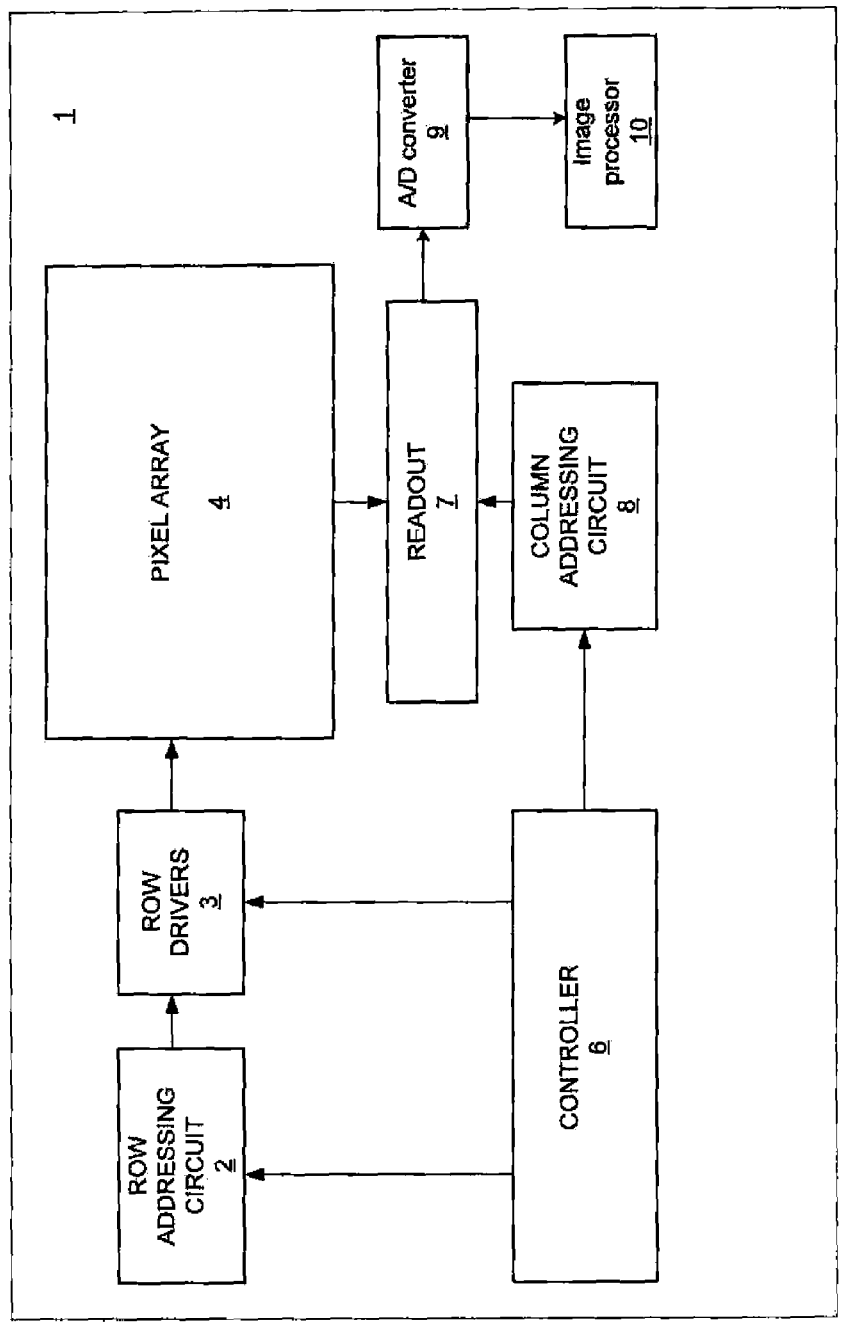
FIG. 1 is a block diagram of a conventional CMOS imager system.

In the following detailed description, reference is made to the accompanying drawings, which form a part hereof, and in which is shown by way of illustration specific embodiments that may be practiced. These embodiments are described in sufficient detail to enable those of ordinary skill in the art to make and use them and it should be appreciated that structural, logical, or procedural changes may be made to the specific embodiments disclosed without departing from the spirit or scope of the invention.

In one embodiment, a color correction matrix, which is applied to a signal from a pixel of a pixel array is related to the value of the pixel signal. Thus, a pixel having a low signal level indicative of a dark pixel uses a color correction matrix different from a pixel having a high signal indicative of a non-dark pixel. Multiple matrixes and associated threshold values may be employed. The matrix values are selected such that reduced noise is present in the corrected pixel values.

Pixel arrays employing a Bayer color filter pattern typically output RGB color pixel values, since each pixel is covered by one of a red, a green, or a blue filter. To obtain red, green, and blue information for each pixel (which may have a 10 bit value for each color) to create a RGB triplet of data, color interpolation is needed. The color values of appropriate neighboring pixels are used to interpolate a missing color value for a pixel. For example, if one of the green pixels on a GRGR sequence line of the Bayer pattern is being read out, the process of color interpolation may estimate that pixel's blue value by looking at the blue above and below it and taking the average of those blue values. For the red estimate, the process looks at the red pixels to the left and right of the green pixel and averages those.

RGB pixel values in captured images are typically specified in a certain standard color space. A standard color space prescribes which color corresponds to every possible RGB triplet value. Raw RGB triplets captured by the sensor array typically must undergo a special operation that adjusts values of raw RGB triplets and makes RGB values of imaged objects of certain colors, as perceived by a human observer after visual chromatic adaptation, correspond to RGB values prescribed by the standard for those colors. This operation is called color correction and is commonly achieved by multiplying the raw RGB triplets by a 3×3 matrix.

A typical color correction operation can be expressed as follows $$\overline{P_{CC_{i,j}}} = A * \overline{P_{RAW_{i,j}}} \tag{1}$$

where A is the color matrix:

$$A = \begin{vmatrix} a_{11} & a_{12} & a_{13} \\ a_{21} & a_{22} & a_{23} \\ a_{31} & a_{32} & a_{33} \end{vmatrix} \tag{2}$$

and $\overline{P_{RAW_{i,j}}}$ is the column-vector of the red, green and blue values for pixel $P_{i,j}$ before color correction $$\overline{P_{RAW_{i,j}}} = \begin{vmatrix} R_{RAW_{i,j}} \\ G_{RAW_{i,j}} \\ B_{RAW_{i,j}} \end{vmatrix} \tag{3}$$

and $\overline{P_{CC_{i,j}}}$ is the column-vector of the red, green and blue values for pixel P(i,j) after color correction $$\overline{P_{CC_{i,j}}} = \begin{vmatrix} R_{CC_{i,j}} \\ G_{CC_{i,j}} \\ B_{CC_{i,j}} \end{vmatrix} \quad (4)$$

The resulting values are $$R_{CC\,i,j} = R_{RAW\,i,j} * a_{11} + G_{RAW\,i,j} * a_{12} + B_{RAW\,i,j} * a_{13} \quad (5)$$

$$G_{CC\,i,j} = R_{RAW\,i,j} * a_{21} + G_{RAW\,i,j} * a_{22} + B_{RAW\,i,j} * a_{23} \quad (6)$$

$$B_{CC\,i,j} = R_{RAW\,i,j} * a_{31} + G_{RAW\,i,j} * a_{32} + B_{RAW\,i,j} * a_{33} \quad (7)$$

Figure 2:
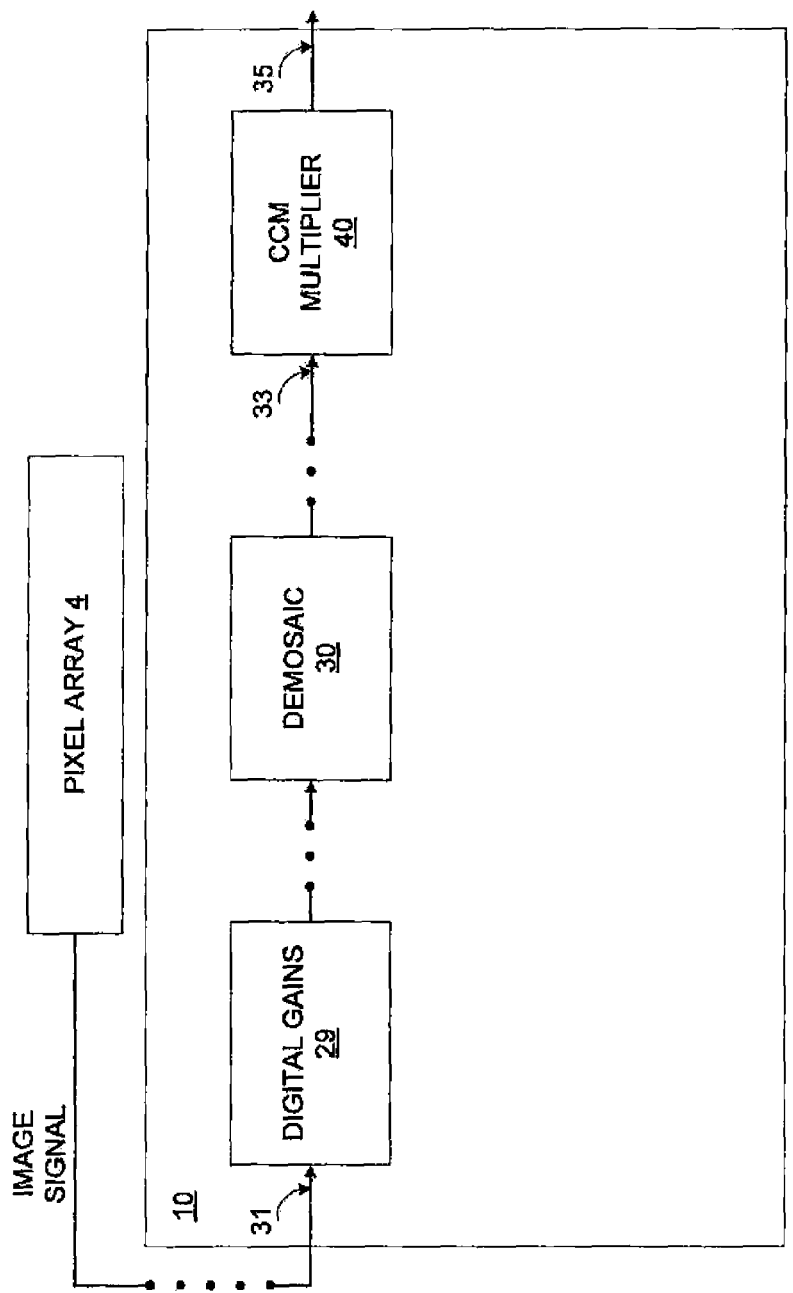
FIG. 2 depicts a portion of a conventional image processor circuit that receives image signals from a pixel array.

The color correction matrix is applied as part of the image processing performed by image processor 10. FIG. 2 depicts a portion of an image processor 10 which receives digital image signals on line 31 from upstream circuits and ultimately from a pixel array 4. The dotted line represents omitted circuits and/or upstream processing tasks In some conventional image processing systems, the image signal is received by a digital gains circuit 29 and then is provided to a demosaic circuit 30 that processes the signals from a sensor array equipped with RGB Bayer color filters to reconstruct missing values of RGB triplets. The digital gains circuit 29 provides gains to the image signal per pre-imposed design or by need.

After processing by demosaic circuit 30, the image signal is provided to the color correction matrix multiplier circuit 40 on line 33. The color correction matrix multiplier circuit 40 applies the color correction matrix, e.g., the matrix of equation (1) to the image signal received on line 33 and provides the post color correction matrix processed signal on line 35. The application of the color correction matrix may be one of many different processing steps that are applied to image signals before being provided downstream for printing, display, or storage.

As noted, in a conventional image processor circuit 10, the color correction matrix is applied regardless of the pixel signal values. Thus, the color correction matrix is equally applied to a dark pixel as it is applied to a light pixel or to an intermediate signal level pixel. This may be undesirable as it can increase undesired noise in the darker pixels.

Embodiments described herein provide a method and system that uses more than one color correction matrix with the choice of which color correction matrix to apply being based on how dark the pixel signal is. Thus, a threshold value, or values, is established, where if the pixel signal level is above the threshold value, then a first color correction matrix is used for that pixel. However, if the pixel signal level is below the threshold value, a second color correction matrix is used for that pixel. The threshold values are also referred to as "knee-points."

Figure 3:
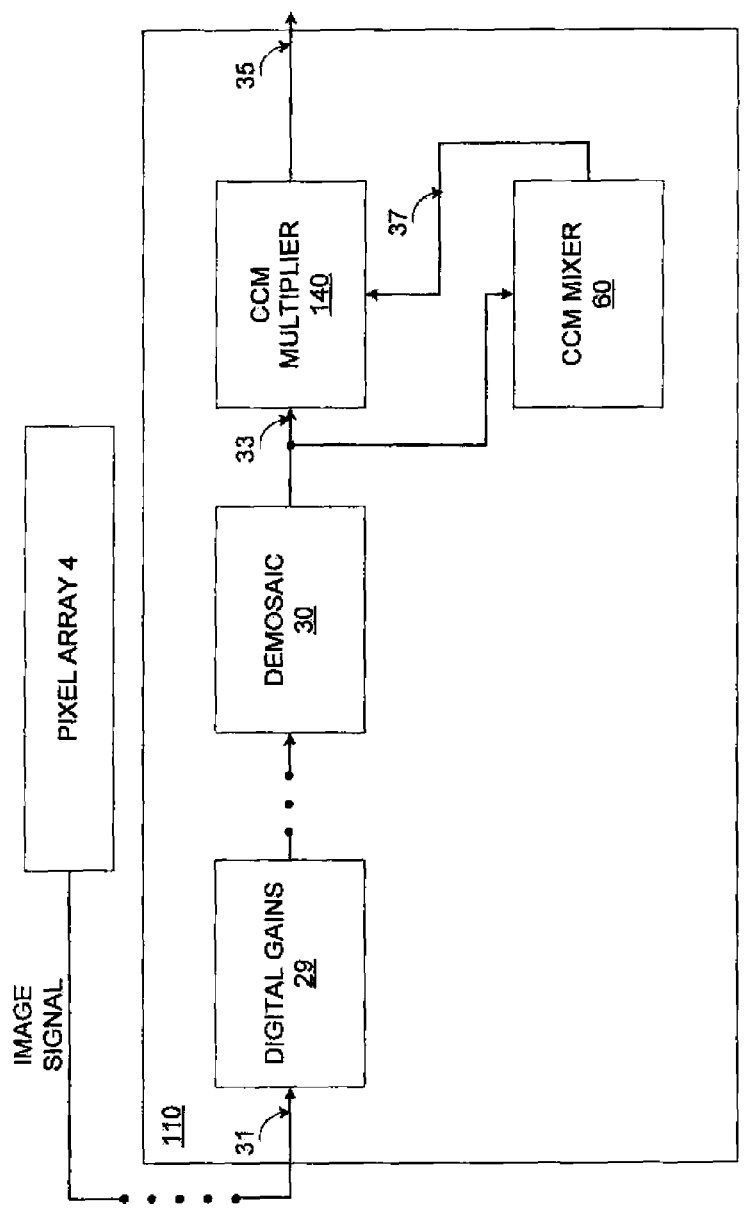
FIG. 3 depicts a portion of an image processor circuit that receives an image signal from a pixel array in accordance with an embodiment.

FIG. 3 depicts a portion of an image processor circuit 110 that receives an image signal on line 31 from upstream circuits in accordance with an embodiment. In the illustrated processor circuit 110, the image signal is received by a demosaic circuit 30 that processes the signals from black or dark pixels to increase saturation or definition of those signals that do not have much color. After processing by demosaic circuit 30, the image signal is provided to the color correction matrix multiplier circuit 140 on line 33. The color correction matrix multiplier circuit 140 applies a color correction matrix to the image signal received on line 33 and provides the post color correction matrix processed signal on line 35. The application of the color correction matrix may be one of many different processing steps that are applied to image signals before being provided downstream for further processing, storage, or output.

The illustrated image processor circuit 110 is different from image processor circuit 10 (FIG. 2) in that image processor circuit 110 includes a color correction matrix mixer 60 that determines and provides an appropriate color correction matrix to be used by the color correction matrix multiplier 140. As discussed below, based on the value of the pixel signal, which is provided by demosaic circuit 30 to the color correction matrix mixer 60 on line 33, a color correction matrix is chosen and that color correction matrix is provided to the color correction matrix multiplier 140 on line 37.

In an embodiment, there are several thresholds and several color correction matrixes that may be supplied by correction matrix mixer 60 respectively corresponding to the thresholds. As an example, matrices A, B, C, and V may be used to create a matrix which is supplied to multiplier 140 and which corresponds to different thresholds levels of a pixel signal. Matrix A is a "normal" color correction matrix noted above with respect to equation (1) as determined to align the color response of a sensor with a known color space. Matrix B is a unity color correction matrix, which is a constant matrix shown as follows:

$$B = \begin{vmatrix} 1 & 0 & 0 \\ 0 & 1 & 0 \\ 0 & 0 & 1 \end{vmatrix} \quad (8)$$

Matrix V is a constant matrix that converts from standard sRGB space to a YUV space as follows:

$$V = \begin{vmatrix} 1 & -1 & 0 \\ 0 & 1 & 0 \\ 0 & -1 & 1 \end{vmatrix} \cdot \begin{vmatrix} 1 & 0 & 0 \\ 0.2126 & 0.7152 & 0.0722 \\ 0 & 0 & 1 \end{vmatrix} \quad (9)$$

Matrix C is a unity color correction matrix with zero saturation (also referred to herein as the desaturation unity color correction matrix). This matrix is also a constant. It is obtained by converting, the unity color correction matrix B to YUV space; that is, multiplying matrix B by matrix V, then multiplying the UV components by zero to remove color components and converting the matrix result back to RGB space, i.e., multiplying by matrix $V^{-1}$ as follows:

$$C = V^{-1} \cdot \begin{vmatrix} 0 & 0 & 0 \\ 0 & 1 & 0 \\ 0 & 0 & 0 \end{vmatrix} \cdot V \cdot B = \begin{vmatrix} 0.2126 & 0.7152 & 0.0722 \\ 0.2126 & 0.7152 & 0.0722 \\ 0.2126 & 0.7152 & 0.0722 \end{vmatrix} \quad (10)$$

In the ensuing discussion the four matrices A, B, C and V are used to produce, in mixer 60, a color correction matrix which is supplied to multiplier 140 in the manner now described.

As said previously, $\overline{P_{RAW_{i,j}}}$ represents an ROB triplet of color data of a signal from a pixel $P_{i,j}$ after demosaicing. As in conventional image processing, the triplet of raw color image data has not yet been color corrected, but has been white point corrected.

Also as said previously, in conventional processing, a signal, $\overline{P_{RAW_{i,j}}}$ from each pixel after demosaicing is color corrected by multiplying the pixel signals by the color correction matrix A. Thus, in conventional color correction processing, $$\overline{P_{CC_{i,j}}} = A * \overline{P_{RAW_{i,j}}}$$

According to an embodiment, the proposed color correction is a based upon the signal value, $m_{i,j}$, from the pixel, where $m_{i,j}$ is the maximum value one of the RGB triplets of raw color data $\{R_{i,jRaw}, G_{i,jRaw}, B_{i,jRaw}\}$, thus, $m_{i,j}$=max $\{R_{i,jRaw}, G_{i,jRaw}, B_{i,jRaw}\}$. Three break points, e.g., a, b, c, are established based on the value of $m_{i,j}$, ideally to process darker pixels in the pixel array differently from less-dark pixels. For example, if each of the RGB triplets has a 10-bit digital value, e.g., having a range from 0-1023 where 0 represents the darkest value and 1023 represents the brightest value, breakpoint a can be set at 60, breakpoint b can be set at 40, and breakpoint c can be set at 20. Therefore, based on the three exemplary breakpoints, there are four different color correction matrixes that can be supplied by the color correction mixer 60 to the color correction multiplier 140 as shown in the following equation:

$$M(m_{i,j}) = \begin{cases} C & 0 \leq m_{i,j} < c \\ C \cdot (1-\alpha) + B \cdot \alpha & c \leq m_{i,j} < b \quad \text{where} \quad \alpha = \frac{m_{i,j} - c}{b - c} \\ B \cdot (1-\alpha) + A \cdot \alpha & b \leq m_{i,j} < a \quad \text{where} \quad \alpha = \frac{m_{i,j} - b}{a - b} \\ A & a \leq m_{i,j} \end{cases} \quad (12)$$

where $M(m_{i,j})$ is the matrix supplied to the color correction multiplier 140. Thus, for all pixel signals that are not deemed dark, e.g., $m_{i,j}$=max $(R_{i,jRaw}, G_{i,jRaw}, B_{i,jRaw})>$(a=60), then $M(m_{i,j})$, the color correction to be applied, is the conventional color correction matrix A (equation 1 above). For darker pixel signals, where $m_{i,j}$=max $(R_{i,jRaw}, G_{i,jRaw}, B_{i,jRaw})<$(a=60) and $m_{i,j}$=max $(R_{i,jRaw}, G_{i,jRaw}, B_{i,jRaw})>$(#40), $M(m_{i,j})$ is combination of the conventional color correction matrix A and the unity color correction matrix B (equation 7 above). For even darker pixel signals, where $m_{i,j}$=max $(R_{i,jRaw}, G_{i,jRaw}, B_{i,jRaw})<$(b=40) and $m_{i,j}$=max $(R_{i,jRaw}, G_{i,jRaw}, B_{i,jRaw})>$(c=20), $M(m_{i,j})$ is combination of the conventional color correction matrix B and desaturated unity color correction matrix C (equation 9 above). The desaturated unity color correction matrix C is similar to the unity color correction matrix B, but as pixel signals this dark generally do not have color, this matrix attenuates some of the pixel signal color and removes noise. For the darkest pixel signals, where $m_{i,j}$=max $(R_{i,jRaw}, G_{i,jRaw}, B_{i,jRaw})<$(c=20), M is the desaturated unity color correction matrix C. This matrix suppresses most, if not all, of the pixel color and achieves the strongest noise reduction.

The color correction threshold solution equation (equation 10) can be simplified for efficient hardware implementation as follows:

In a preferred embodiment, $k_{bc}$ and $k_{ab}$ are constants and are pre-computed and pre-loaded into hardware registers. Additionally, $\Delta_{BC}$ and $\Delta_{AB}$ are pre-computed and pre-loaded into hardware registers. Furthermore, the values of matrices A, B, and C are pre-loaded into hardware registers. Alternatively, the different matrixes $M(m_{i,j})$ can be preloaded along with the selected points a, b, and c in hardware registers, or the breakpoints may be settable by a user.

Although an embodiment is discussed above in reference to having three breakpoints, a, b, c, the invention is not so limited and any number of breakpoints can be set. Additionally, the breakpoint thresholds are not limited to being 60, 40, and 20; as other breakpoint values can be used. Furthermore, although specific color correction matrices A, B, C are used above, the invention is not so limited, and other color correction matrixes can be implemented which process darker pixels differently than lighter pixels.

As a further modification, the matrix which is used for color correction is based on the break points a, b, c and the maximum value $m_{i,j}$ of a pixel color triplet of a demosaiced pixel; however, the value $m_{i,j}$ can also be based on an average of the three color component values in a pixel color triplet.

Thus, the image processor circuit 110 applies a color correction matrix dependent on the relation of the value of the pixel signal to predetermined breakpoints. The darker the pixel, the increased amount of color that is discarded when performing a color correction producing an increased signal-to-noise ratio.

In another embodiment, the color correction matrix supplied by color correction mixer 60 is not a function of the pixel signal value, but is a function of another value that is determined as part of an image capture process. For example, a color correction matrix may be selected based on the value of the gain applied to pixel signals. Therefore, different color correction matrices are applied to pixel signals based on different gain settings. For example, different gain setting breakpoints are established, similar to approach described above with respect to breakpoints a, b, and c. Gain settings are grouped and bounded by breakpoints that correspond to a specific color correction matrix. Thus, a gain setting applied to a signal determines the appropriate color correction matrix that is used. For example, in good illumination when low values of analog gains are used the breakpoints could be set to a=60, b=0, and c=0.

Although discussed above in reference to having three breakpoints, embodiments are not so limited and any number of breakpoints can be set. Additionally, the breakpoint thresholds are not limited to being a=60, b=0, c=0, as other breakpoint values can be used. Furthermore, although specific color correction matrices A, B, C are used above, the embodiments are not so limited, and other color correction matrixes can be implemented which process darker pixels differently than lighter pixels.

In another aspect, an alternative way to calculate the matrix and perform color correction is provided. To derive the general case of processing, we perform normalization of matrix $$M(m_{i,j}) = \begin{cases} C & 0 \leq m_{i,j} < c \\ C + \Delta_{BC} \cdot \alpha & c \leq m_{i,j} < b \quad \alpha = (m_{i,j} - c) \cdot k_{bc} \quad \Delta_{BC} = B - C \quad k_{bc} = \frac{1}{b-c} \\ B + \Delta_{AB} \cdot \alpha & b \leq m_{i,j} < a \quad \alpha = (m_{i,j} - b) \cdot k_{ab} \quad \Delta_{AB} = A - B \quad k_{ab} = \frac{1}{a-b} \\ A & a \leq m_{i,j} \end{cases} \quad (13)$$

A. The normalization process factors out digital gains applied to RGB raw channels out of the matrix. The digital gains are then applied to the unity matrix.

Matrix A is a product of normalized color correction matrix D and a white point transformation matrix G. In cases when G is diagonal, its coefficients correspond to digital gains applied to raw data. The normalized matrix D is constructed so that each row sums up to unity.

$$A = \begin{vmatrix} a_{11} & a_{12} & a_{13} \\ a_{21} & a_{22} & a_{23} \\ a_{31} & a_{32} & a_{33} \end{vmatrix} = D \cdot G \quad (14)$$

$$D = \begin{vmatrix} \frac{a_{11}}{a_{11}+a_{12}+a_{13}} & \frac{a_{12}}{a_{11}+a_{12}+a_{13}} & \frac{a_{13}}{a_{11}+a_{12}+a_{13}} \\ \frac{a_{21}}{a_{21}+a_{22}+a_{23}} & \frac{m_{22}}{a_{21}+a_{22}+a_{23}} & \frac{m_{23}}{a_{21}+a_{22}+a_{23}} \\ \frac{a_{31}}{a_{31}+a_{32}+a_{33}} & \frac{a_{32}}{a_{31}+a_{32}+a_{33}} & \frac{a_{33}}{a_{31}+a_{32}+a_{33}} \end{vmatrix}$$

$$G = D^{-1} \cdot A$$

Matrix B is the unity matrix combined with digital gains. This matrix is a constant.

$$B = \begin{vmatrix} 1 & 0 & 0 \\ 0 & 1 & 0 \\ 0 & 0 & 1 \end{vmatrix} \cdot G \quad (15)$$

Matrix C is the unity matrix combined with digital gains and having a zero saturation. This matrix is a constant. It is obtained by converting the unity matrix to YUV space (multiply by V), multiplying the UV components by zero to remove color components and converting the result back to standard sRGB space (multiply by $V^{-1}$).

$$C = V^{-1} \cdot \begin{vmatrix} 0 & 0 & 0 \\ 0 & 1 & 0 \\ 0 & 0 & 0 \end{vmatrix} \cdot V \cdot B \quad (16)$$

With these matrices re-defined the color correction is applied to each pixel in the same manner except for the following:

Define $m_{i,j}$ as $$|R_{GAINEDi,j}, G_{GAINEDi,j}, B_{GAINEDi,j}| = G \cdot |R_{RAWi,j}, G_{RAWi,j}, B_{RAWi,j}|$$

$$m_{i,j} = \max(R_{GAINEDi,j}, G_{GAINEDi,j}, B_{GAINEDi,j}) \quad (17)$$

Note that if digital gains are applied to raw data, matrix G appears diagonal and max(R,G,B) is easy to calculate.

There may be a ease when the matrix maps gray pixels into tinted ones. For example, a customer may want to force grays to have a yellowish tint in incandescent illumination. This would provide a "warm" look to the picture. This is typically achieved by combining a normalized matrix with digital gains applied after.

$$A = \begin{vmatrix} a_{11} & a_{12} & a_{13} \\ a_{21} & a_{22} & a_{23} \\ a_{31} & a_{32} & a_{33} \end{vmatrix} = G_{POST} \cdot D \cdot G \quad (18)$$

In this case the unity matrix combined with digital gains is defined as $$B = G_{POST} \cdot \begin{vmatrix} 1 & 0 & 0 \\ 0 & 1 & 0 \\ 0 & 0 & 1 \end{vmatrix} \cdot G \quad (19)$$

Thus, the resulting picture has been modified to have a different cast of light.

Figure 4:
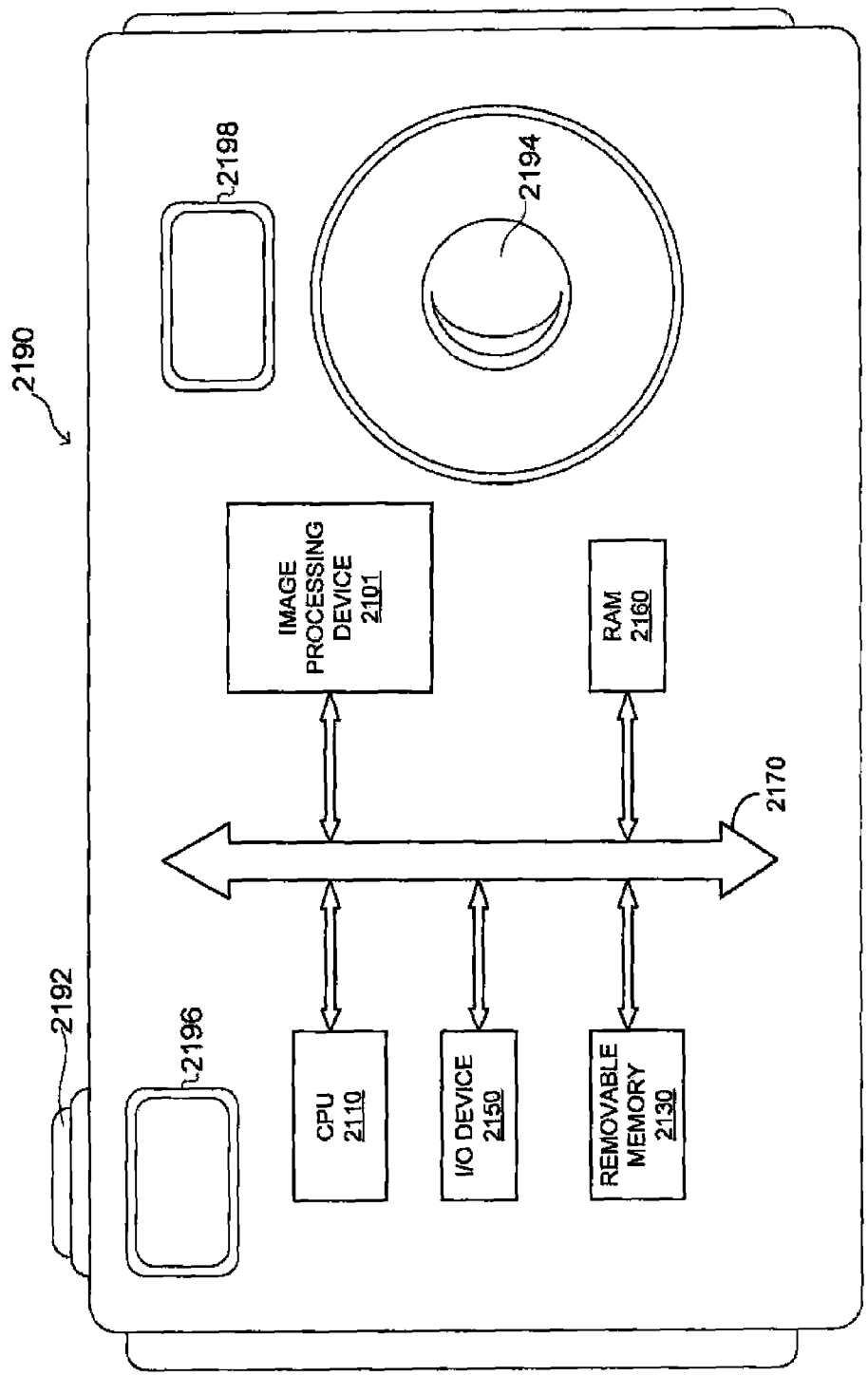
FIG. 4 is a block diagram representation of a image processor system, e.g., a camera system, incorporating an embodiment described herein.

FIG. 4 is a block diagram representation of an image processor system, e.g., a camera system 2190, incorporating an image processing device 2101 in accordance with an image processor circuit implementing an embodiment described herein. A video or still camera system 2190 generally comprises a shutter release button 2192, a view finder 2196, a flash 2198 and a lens system 2194. A camera system 2190 generally also comprises a central processing unit (CPU) 2110, for example, a microprocessor for controlling camera functions that communicates with one or more input/output devices (I/O) 2150 over a bus 2170. The CPU 2110 also exchanges data with random access memory (RAM) 2160 over bus 2170, typically through a memory controller. The camera system may also include peripheral devices such as a removable memory 2130 that also communicates with CPU 2110 over the bus 2170. Image processing device 2101 is coupled to the processor system and includes the embodiments of a color correction circuit as described herein. Other processor systems which may employ video processing devices 2101 include computers, PDAs, cell phones, scanners, machine vision systems, and other systems employing image processing operations.

While the embodiments have been described and illustrated with reference to specific embodiments, it should be understood that many modifications and substitutions could be made without departing from the spirit and scope of the claimed invention. Accordingly, the claimed invention is not to be considered as limited by the foregoing description but is only limited by the scope of the appended claims. For example, color correction is described above with respect to matrixes, but the invention is not so limited and color correction can be applied without the use of matrixes. Another example being that image processor 10, 110 can be hardwired logic, but can also be implemented as a programmed processor or a combination of the two. Although embodiments have been described with reference to an image processor which is part of an imaging device, the invention is not so limited. The image processor may be implemented as instructions stored on a storage medium which are executed by a computer or other processing device acting as an image processor which receives image data. Accordingly, the invention is not limited by the description of the embodiments described herein, but is only limited by the scope of the pending claims.

What is claimed as new and desired to be protected by Letters Patent of the United States is:

1. A method of performing a color correction with processing circuitry, comprising:

with the processing circuitry, for a plurality of pixels in an image, applying a first color correction matrix to pixels that are brighter than a first pre-determined threshold; and with the processing circuitry, applying a second color correction matrix to pixels that are darker than said first pre-determined threshold, wherein the second color correction matrix is formed from a sum of the first color correction matrix and a unity color correction matrix.

2. The method of claim 1 further comprising:

with the processing circuitry, applying a third color correction matrix to pixels that are darker than a second pre-determined threshold, wherein said second pre-determined threshold is lower than said first pre-determined threshold.

3. The method of claim 2 further comprising:

with the processing circuitry, applying a fourth color correction matrix to pixels that are darker than a third pre-determined threshold, wherein said third pre-determined threshold is lower than said second pre-determined threshold.

4. The method of claim 3, wherein said fourth color correction matrix is a desaturated unity color correction.

5. The method of claim 3, wherein said third color correction matrix is a combination of a desaturated unity color correction and a unity color correction.

6. A method of performing a color correction on image signals using processing circuitry, comprising:

with the processing circuitry, determining which of the components of an RGB triplet of a pixel signal has a maximum value among the components of the RGB triplet;

with the processing circuitry, applying a first color correction to a pixel signal in response to determining that the maximum value among the components of the RGB triplet of the pixel signal is higher than a first pre-determined threshold a; and with the processing circuitry, applying a second different color correction to said pixel signal in response to determining that the maximum value among the components of the RGB triplet of the pixel signal is lower than said first pre-determined threshold a.

7. The method of claim 6, where said first color correction is a color correction equation of the form:

$$A = \begin{vmatrix} a_{11} & a_{12} & a_{13} \\ a_{21} & a_{22} & a_{23} \\ a_{31} & a_{32} & a_{33} \end{vmatrix},$$

which is applied to said pixel signal, wherein values for $a_{11} \ldots a_{33}$ are predetermined.

8. The method of claim 6 further comprising:

applying a third color correction to said pixel signal if the maximum value of RGB triplet of the pixel signal in is lower than a second pre-determined threshold b, wherein said second pre-determined threshold b is lower than said first pre-determined threshold a.

9. The method of claim 8, wherein said second color correction is a color correction equation of the form: $B*(1-\alpha)+A*\alpha$, which is applied to said pixel signal, and wherein $$\alpha = \frac{m_{i,j}-b}{a-b}, B = \begin{vmatrix} 1 & 0 & 0 \\ 0 & 1 & 0 \\ 0 & 0 & 1 \end{vmatrix}, \text{ and } A = \begin{vmatrix} a_{11} & a_{12} & a_{13} \\ a_{21} & a_{22} & a_{23} \\ a_{31} & a_{32} & a_{33} \end{vmatrix}.$$

10. The method of claim 8, wherein said third color correction is a color correction equation of the form $C*(1-\alpha)+B*\alpha$, which is applied to said pixel signal, wherein $$\alpha = \frac{m_{i,j}-c}{b-c}, C = V^{-1} \cdot \begin{vmatrix} 0 & 0 & 0 \\ 0 & 1 & 0 \\ 0 & 0 & 0 \end{vmatrix} \cdot V \cdot B = \begin{vmatrix} 0.2126 & 0.7152 & 0.0722 \\ 0.2126 & 0.7152 & 0.0722 \\ 0.2126 & 0.7152 & 0.0722 \end{vmatrix},$$

$$V = \begin{vmatrix} 1 & -1 & 0 \\ 0 & 1 & 0 \\ 0 & -1 & 1 \end{vmatrix} \cdot \begin{vmatrix} 1 & 0 & 0 \\ 0.2126 & 0.7152 & 0.0722 \\ 0 & 0 & 1 \end{vmatrix}, B = \begin{vmatrix} 1 & 0 & 0 \\ 0 & 1 & 0 \\ 0 & 0 & 1 \end{vmatrix}, \text{ and}$$

$$A = \begin{vmatrix} a_{11} & a_{12} & a_{13} \\ a_{21} & a_{22} & a_{23} \\ a_{31} & a_{32} & a_{33} \end{vmatrix},$$

and wherein values for $a_{11} \ldots a_{33}$ are predetermined.

11. The method of claim 10 further comprising:

applying a fourth color correction to said pixel signal if maximum value m is lower than a third pre-determined threshold c, wherein said third pre-determined threshold c is lower than said second pre-determined threshold b.

12. The method of claim 11, wherein said fourth color correction is an equation of the form:

$$C = V^{-1} \cdot \begin{vmatrix} 0 & 0 & 0 \\ 0 & 1 & 0 \\ 0 & 0 & 0 \end{vmatrix} \cdot V \cdot B = \begin{vmatrix} 0.2126 & 0.7152 & 0.0722 \\ 0.2126 & 0.7152 & 0.0722 \\ 0.2126 & 0.7152 & 0.0722 \end{vmatrix}, \text{ where}$$

$$V = \begin{vmatrix} 1 & -1 & 0 \\ 0 & 1 & 0 \\ 0 & -1 & 1 \end{vmatrix} \cdot \begin{vmatrix} 1 & 0 & 0 \\ 0.2126 & 0.7152 & 0.0722 \\ 0 & 0 & 1 \end{vmatrix}, \text{ and } B = \begin{vmatrix} 1 & 0 & 0 \\ 0 & 1 & 0 \\ 0 & 0 & 1 \end{vmatrix}.$$

13. A method of performing a color correction using an image processor, comprising:

with the image processor, applying a first color correction to a pixel signal in response to determining that a characteristic associated with said pixel signal is higher than a first pre-determined threshold; and with the image processor, applying a second different color correction to said pixel signal in response to determining that said characteristic is lower than said first pre-determined threshold, wherein the characteristic associated with said pixel signal is a gain setting applied to said pixel signal.

14. The method of claim 13, further comprising:

with the image processor, applying a third color correction to said pixel signal in response to determining that the characteristic is lower than a second pre-determined threshold, wherein said second pre-determined threshold is lower than said first pre-determined threshold.

15. The method of claim 14, further comprising:
with the image processor, applying a fourth color correction to said pixel signal in response to determining that the characteristic is lower than a third pre-determined threshold, wherein said third pre-determined threshold is lower than said second pre-determined threshold.

16. An image processor for performing a color correction process on image signals, said image processor comprising:
a color correction matrix multiplier configured to apply a color correction matrix to a pixel signal produced by a pixel; and
a color correction matrix mixer configured to determine a color correction matrix which is applied by said matrix multiplier based on a value of the pixel signal, wherein the color correction matrix mixer is coupled to and configured to provide the determined color correction matrix to the color correction matrix multiplier, wherein the color correction matrix mixer is configured to determine a first color correction matrix in response to determining that the pixel signal is higher than a first pre-determined threshold, and wherein the color correction matrix mixer is configured to determine a second color correction matrix in response to determining that the pixel signal is lower than the first pre-determined threshold, wherein said first color correction matrix is $$\begin{vmatrix} a_{11} & a_{12} & a_{13} \\ a_{21} & a_{22} & a_{23} \\ a_{31} & a_{32} & a_{33} \end{vmatrix},$$

wherein said values for $a_{11} \ldots a_{33}$ are predetermined, wherein said second color correction matrix is $B*(1-\alpha)+A*\alpha$, wherein $$\alpha = \frac{m_{i,j}-b}{a-b}, B = \begin{vmatrix} 1 & 0 & 0 \\ 0 & 1 & 0 \\ 0 & 0 & 1 \end{vmatrix}, A = \begin{vmatrix} a_{11} & a_{12} & a_{13} \\ a_{21} & a_{22} & a_{23} \\ a_{31} & a_{32} & a_{33} \end{vmatrix},$$

mij is the value of the pixel signal, a is said first pre-determined threshold, and b is said second pre-determined threshold, and wherein said third color correction matrix is $C*(1-\alpha)+B*\alpha$ and wherein $$\alpha = \frac{m_{i,j}-c}{b-c}, C = V^{-1} \cdot \begin{vmatrix} 0 & 0 & 0 \\ 0 & 1 & 0 \\ 0 & 0 & 0 \end{vmatrix} \cdot V \cdot B = \begin{vmatrix} 0.2126 & 0.7152 & 0.0722 \\ 0.2126 & 0.7152 & 0.0722 \\ 0.2126 & 0.7152 & 0.0722 \end{vmatrix},$$

$$V = \begin{vmatrix} 1 & -1 & 0 \\ 0 & 1 & 0 \\ 0 & -1 & 1 \end{vmatrix} \cdot \begin{vmatrix} 1 & 0 & 0 \\ 0.2126 & 0.7152 & 0.0722 \\ 0 & 0 & 1 \end{vmatrix},$$

$$B = \begin{vmatrix} 1 & 0 & 0 \\ 0 & 1 & 0 \\ 0 & 0 & 1 \end{vmatrix}, \text{ and } A = \begin{vmatrix} a_{11} & a_{12} & a_{13} \\ a_{21} & a_{22} & a_{23} \\ a_{31} & a_{32} & a_{33} \end{vmatrix}.$$

17. The image processor of claim 16, wherein said color correction matrix mixer is configured to determine a third color correction matrix in response to determining that the pixel signal is lower than a second pre-determined threshold.

18. The image processor of claim 16, wherein said color correction matrix mixer is part of a camera system.

19. The image processor of claim 16, wherein said color correction matrix mixer is configured to determine a fourth color correction matrix if the pixel signal is lower than a third pre-determined threshold, wherein said fourth color correction matrix is $$C = V^{-1} \cdot \begin{vmatrix} 0 & 0 & 0 \\ 0 & 1 & 0 \\ 0 & 0 & 0 \end{vmatrix} \cdot V \cdot B = \begin{vmatrix} 0.2126 & 0.7152 & 0.0722 \\ 0.2126 & 0.7152 & 0.0722 \\ 0.2126 & 0.7152 & 0.0722 \end{vmatrix},$$

and wherein $$V = \begin{vmatrix} 1 & -1 & 0 \\ 0 & 1 & 0 \\ 0 & -1 & 1 \end{vmatrix} \cdot \begin{vmatrix} 1 & 0 & 0 \\ 0.2126 & 0.7152 & 0.0722 \\ 0 & 0 & 1 \end{vmatrix}, B = \begin{vmatrix} 1 & 0 & 0 \\ 0 & 1 & 0 \\ 0 & 0 & 1 \end{vmatrix},$$

and c is said third pre-determined threshold.

* * * * *